(12) United States Patent
Rolle

(10) Patent No.: US 10,070,021 B1
(45) Date of Patent: Sep. 4, 2018

(54) CAMERA-COVERING ACCESSORY FOR A COMPUTER

(71) Applicant: Ryan Rolle, Coral Springs, FL (US)

(72) Inventor: Ryan Rolle, Coral Springs, FL (US)

( * ) Notice: Subject to any disclaimer, the term of this patent is extended or adjusted under 35 U.S.C. 154(b) by 0 days.

(21) Appl. No.: 15/614,712

(22) Filed: Jun. 6, 2017

(51) Int. Cl.
*H04N 5/225* (2006.01)
*G03B 11/04* (2006.01)
*G06F 1/16* (2006.01)

(52) U.S. Cl.
CPC ......... *H04N 5/2251* (2013.01); *G03B 11/041* (2013.01); *G06F 1/1686* (2013.01)

(58) Field of Classification Search
CPC .... H04N 5/2251; G06F 1/1686; G03B 11/041
See application file for complete search history.

(56) References Cited

U.S. PATENT DOCUMENTS

| | | | |
|---|---|---|---|
| D669,112 S * | 10/2012 | Gustaveson | ................. D16/208 |
| D718,803 S | 12/2014 | Smith | |
| 9,197,850 B2 | 11/2015 | Koberling | |
| 9,305,538 B2 | 4/2016 | Tyson | |
| D782,562 S * | 3/2017 | Gustaveson, II | ............. D16/237 |
| 2011/0058255 A1 | 3/2011 | Weiss | |
| 2011/0099908 A1 * | 5/2011 | Fortmann | ............. G06F 1/1613 49/373 |
| 2012/0301132 A1 | 11/2012 | Mitskog | |
| 2013/0088639 A1 * | 4/2013 | Mundt | ................. H04N 5/2251 348/372 |
| 2014/0198439 A1 | 7/2014 | Pietro | |
| 2014/0220269 A1 | 8/2014 | Ogufere | |
| 2018/0059510 A1 * | 3/2018 | Gustaveson, II | .... G03B 11/048 |

FOREIGN PATENT DOCUMENTS

WO     2009137800 A2     11/2009

* cited by examiner

*Primary Examiner* — Hung Lam
(74) *Attorney, Agent, or Firm* — Kyle A. Fletcher, Esq.

(57) ABSTRACT

The camera-covering accessory for a computer is configured for use with an image sensor. The image sensor is mounted on a flat surface. The camera-covering accessory for a computer is a protective structure that: 1) encloses the image sensor when the image sensor is not in use; and, 2) forms an aperture that allow light to enter the image sensor when the image sensor is in use. The camera-covering accessory for a computer is a self-mounting structure that is placed directly over the image sensor. The camera-covering accessory for a computer comprises a barrier structure, a shutter door, and an adhesive. The shutter door is formed within the barrier structure. The adhesive attaches the barrier structure to the flat surface the images sensor is mounted on. The shutter door opens and close

16 Claims, 3 Drawing Sheets

CAMERA-COVERING ACCESSORY FOR A COMPUTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of electric communication technique including studio circuitry for a digital camera, more specifically, a constructional detail regarding the mounting of the digital camera.

An image sensor is configured for use with a computer. The computer is further defined with a display. The image sensor receives light from the exterior of the image sensor and converts the received light into a digital representation of sufficient detail to allow the computer to create and display a visual reproduction of the source of the captured light. An example of such an image sensor is commonly referred to as a digital camera. Within this disclosure, examples of the described image sensor would include commercially available CCD (charged coupled device) image sensors and commercially available CMOS (complementary metal oxide semiconductor) image sensors.

SUMMARY OF INVENTION

The camera-covering accessory for a computer is configured for use with an image sensor. The image sensor is further associated with a logic processing device such as a computer. The image sensor is mounted on a flat surface. An example of such a flat surface would include, but is not limited to, the display of a computer. An example of the arrangement described in the preceding three sentences includes, but is not limited to, a device commonly referred to as a "webcam." The camera-covering accessory for a computer is a protective structure that: 1) encloses the image sensor when the image sensor is not in use; and, 2) forms an aperture that allow light to enter the image sensor when the image sensor is in use. The camera-covering accessory for a computer is a self-mounting structure that is placed directly over the image sensor. The camera-covering accessory for a computer comprises a barrier structure, a shutter door, and an adhesive. The shutter door is formed within the barrier structure. The adhesive attaches the barrier structure to the flat surface the images sensor is mounted on. The shutter door opens and close the aperture to allow light to pass to the image sensor.

These together with additional objects, features and advantages of the camera-covering accessory for a computer will be readily apparent to those of ordinary skill in the art upon reading the following detailed description of the presently preferred, but nonetheless illustrative, embodiments when taken in conjunction with the accompanying drawings.

In this respect, before explaining the current embodiments of the camera-covering accessory for a computer in detail, it is to be understood that the camera-covering accessory for a computer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the camera-covering accessory for a computer.

It is therefore important that the claims be regarded as including such equivalent construction insofar as they do not depart from the spirit and scope of the camera-covering accessory for a computer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
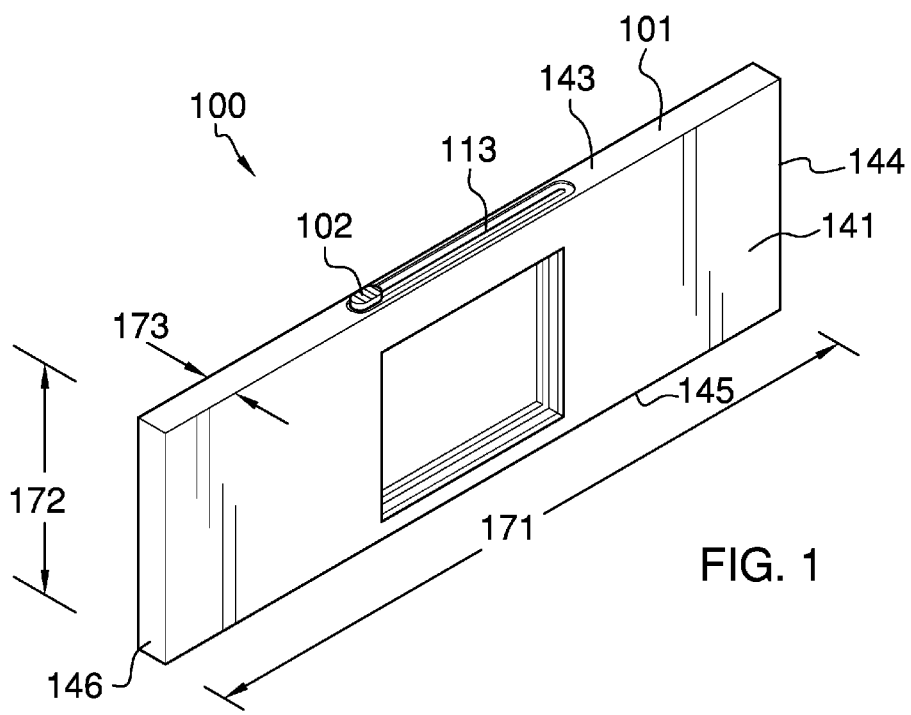
FIG. 1 is a perspective view of an embodiment of the disclosure.
Figure 2:
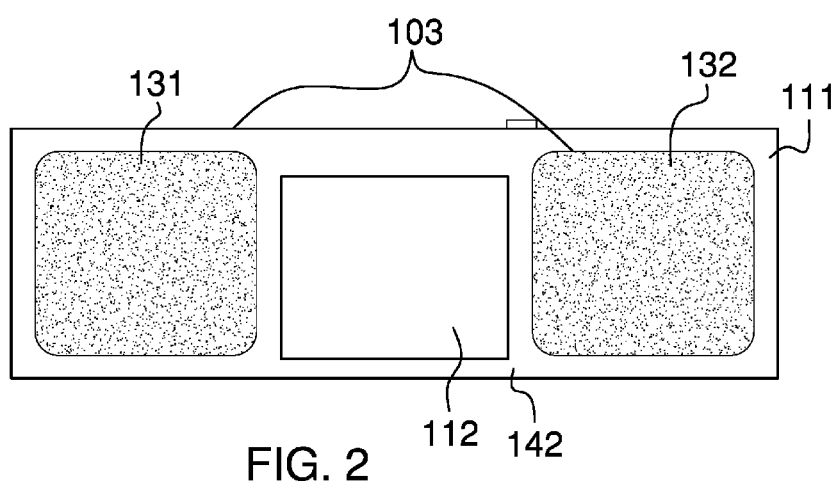
FIG. 2 is a rear view of an embodiment of the disclosure.
Figure 3:
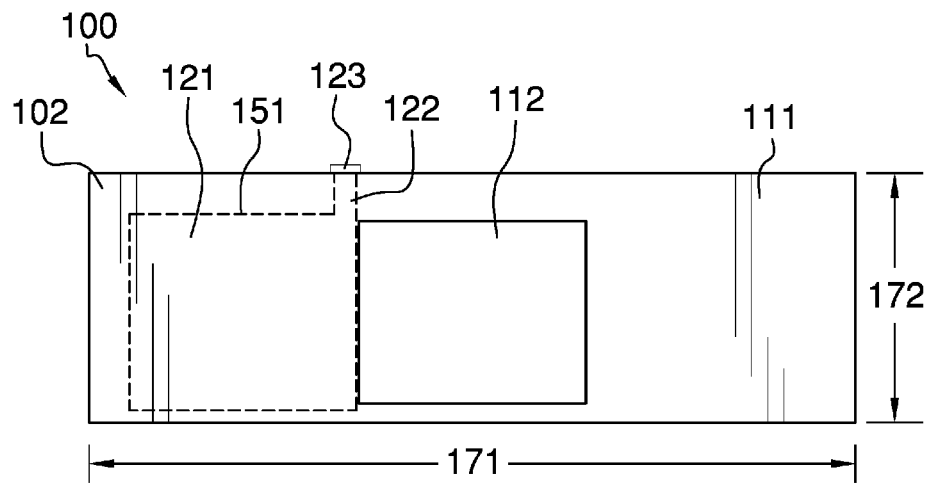
FIG. 3 is a front view of an embodiment of the disclosure.
Figure 4:
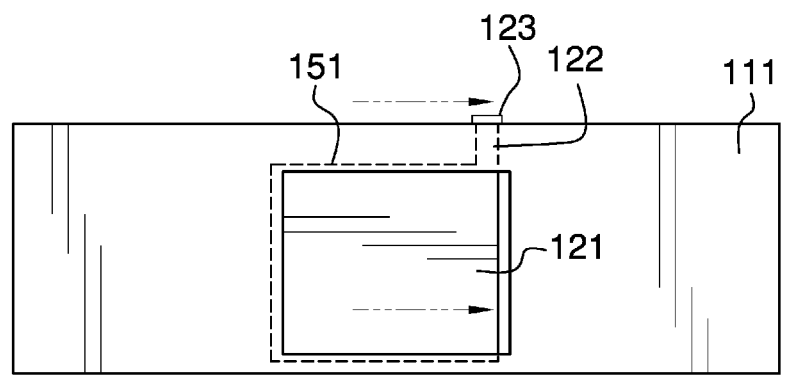
FIG. 4 is a detail view of an embodiment of the disclosure.
Figure 5:
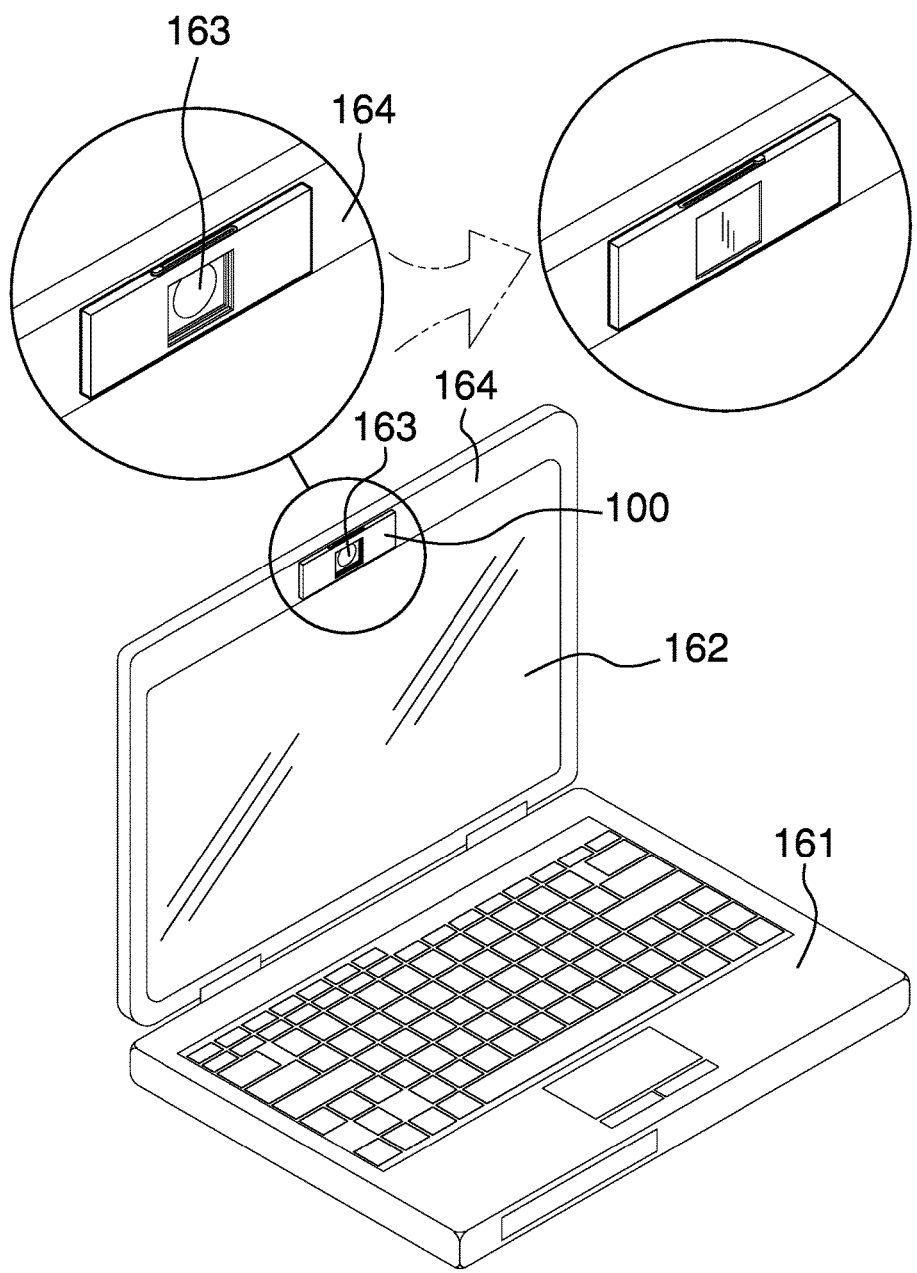
FIG. 5 is an in use view of an embodiment of the disclosure.

Detailed reference will now be made to one or more potential embodiments of the disclosure, which are illustrated in FIGS. 1 through 5.

The camera-covering accessory for a computer 100 (hereinafter invention) is configured for use with an image sensor 163. The image sensor 163 is further associated with a logic processing device such as a computer 161. The image sensor 163 is mounted on a flat surface 164. An example of such a flat surface 164 would include, but is not limited to, the display 162 of a computer 161. An example of the arrangement described in the preceding three sentences includes, but is not limited to, a device commonly referred to as a "webcam." The invention 100 is a protective structure that: 1) encloses the image sensor 163 when the image sensor 163 is not in use; and, 2) forms an aperture that allow light to enter the image sensor 163 when the image sensor 163 is in use. The invention 100 is a self-mounting structure that is placed directly over the image sensor 163. The invention 100 comprises a barrier structure 101, a shutter door 102, and an adhesive 103. The shutter door 102 is formed within the barrier structure 101. The adhesive 103 attaches the barrier structure 101 to the flat surface 164 the image sensor 163 is mounted on. The shutter door 102 opens and close the aperture to allow light to pass to the image sensor 163.

Within this disclosure, the flat surface 164 refers to the surface upon which the image sensor 163 is assumed to be mounted.

The barrier structure 101 is a hollow rectangular block 111 structure that is placed over the image sensor 163. The barrier structure 101 forms a protective shell that prevents the image sensor 163 from collecting unauthorized images from the surroundings of the image sensor 163. The barrier structure 101 controls the light reflected from objects in the surrounding area from reaching the image sensor 163 through the opening and closing of the shutter door 102. The barrier structure 101 comprises a rectangular block 111, a lens aperture 112, and a slider slot 113. The rectangular block 111 is further defined with a first face 141, a second face 142, a third face 143, a fourth face 144, a fifth face 145, and a sixth face 146. The rectangular block 111 is further defined with a width 171, a height 172, and a depth 173.

The first face 141 is the face of the rectangular block 111 that has the largest surface area. The second face 142 is the face of the rectangular block 111 that is distal from the first face 141. The third face 143 is the face of the rectangular block 111 that: 1) joins the first face 141 to the second face 142; and, 2) contains the slider slot 113. The fourth face 144 is a face of the rectangular block 111 that joins the first face 141 to the second face 142. The fifth face 145 is a face of the rectangular block 111 that joins the first face 141 to the second face 142. The sixth face 146 is a face of the rectangular block 111 that joins the first face 141 to the second face 142. When viewing the first face 141 directly the third face 143, the fourth face 144, the fifth face 145, and the sixth face 146 are positioned in clockwise order.

The width 171 refers to the direction of the center axis of the rectangular block 111 that runs from the fourth face 144 to the sixth face 146. The height 172 refers to a direction of the rectangular block 111 that is perpendicular to the width 171 direction of the rectangular block 111. The height 172 runs from the third face 143 to the fifth face 145. The depth 173 refers to a direction of the rectangular block 111 that is perpendicular to both the width 171 and the height 172 directions of the rectangular block 111. The depth 173 runs from the first face 141 to the second face 142.

The rectangular block 111 is the primary structure of the barrier structure 101. The rectangular block 111 is a hollow structure formed in the shape of a rectangular prism. The rectangular block 111 may be formed with rounded rectangles. The hollow interior of the rectangular block 111 is sized such that the shutter door 102 can be placed within the hollow interior of the rectangular block 111.

The lens aperture 112 is a radial hole that is formed through the rectangular block 111 from the first face 141 to the second face 142. The lens aperture 112 is sized such that the image sensor 163 can be placed within the hollow interior of the rectangular block 111 through the lens aperture 112. The depth 173 of the rectangular block 111 is sized such that the image sensor 163 is completely contained within the rectangular block 111 when the shutter door 102 of the invention 100 is in the closed position.

The slider slot 113 is a slot that is formed through the third face 143 of the rectangular block 111. The slider slot 113 is sized such that a handle 122 may be inserted through the slider slot 113 in a manner that allows the position of the shutter door 102 to be adjusted. The range of motion of the shutter door 102 is controlled by the span in the width 171 direction of the slider slot 113.

The shutter door 102 is an opaque barrier that is positioned inside the barrier structure 101. The shutter door 102 opens and closes a lens aperture 112 to allow light to reach the image sensor 163. The shutter door 102 is formed in a plate structure. The shutter door 102 comprises a plate 121, a handle 122, and a grip 123. The plate 121 is further defined with a first edge 151. The first edge 151 is the edge of the plate 121 that is proximal to the third face 143 of the rectangular block 111.

The plate 121 is an opaque rectangular plate structure that is placed within the hollow interior of the rectangular block 111 such that the plate 121 can slide along the rectangular block 111 along the width 171 direction. The outer dimensions of the plate 121 are greater than the inner dimensions of the lens aperture 112 such that the plate 121 may be placed over the lens aperture 112 to prevent light from reaching the image sensor 163.

The handle 122 is a bar that projects away from the plate 121 through the slider slot 113. The handle 122 attaches to the first edge 151 of the plate 121 such that handle 122 projects away from the interior of the plate 121. The handle 122 attaches to the first edge 151 of the plate 121 in the manner of a cantilever. The handle 122 attaches to the plate 121 such that the handle 122 extends the plane of the plate 121 towards the third face 143 of the rectangular block 111. The handle 122 is sized such that the handle 122 projects through the slider slot 113. The handle 122 is a lever is used to adjust the position of the plate 121 within the rectangular block 111.

The grip 123 is an accommodation formed on the free end of the handle 122 that allows for easier manipulation of the handle 122. The grip 123 attaches to the free end of the handle 122 such that the grip 123 can be used to move the plate 121 within the rectangular block 111. The slider slot 113 is a groove that is formed through the third face 143 of the rectangular block 111.

The adhesive 103 is a chemical substance that attaches the barrier structure 101 to the flat surface 164 that the image sensor 163 is mounted on. The adhesive 103 comprises a first adhesive patch 131 and a second adhesive patch 132. The first adhesive patch 131 is an adhesive coating that is applied to the second face 142 of the rectangular block 111. The second adhesive patch 132 is an adhesive coating that is applied to the second face 142 of the rectangular block 111. The first adhesive patch 131 and the second adhesive patch 132 are used to attach the second face 142 of the rectangular block 111 to the flat surface 164 upon which the image sensor 163 is mounted.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Computer: As used in this disclosure, a computer is a programmable electrical device that processes externally provided inputs to generate outputs that are determined from a previously programmed set of instructions.

Display: As used in this disclosure, a display is a surface upon which is presented an image, potentially including, but not limited to, graphic images and text, that is interpretable by an individual viewing the projected image in a meaningful manner.

Filtering Material: As used in this disclosure, a filtering material refers to an object or material that prevents or inhibits the passage of radiation of specific wavelengths through the object or material.

Grip: As used in this disclosure, a grip is an accommodation formed within an object that allows the object to be grasped or manipulated by a hand.

Handle: As used in this disclosure, a handle is an object by which a tool, object, or door is held or manipulated with the hand.

Image: As used in this disclosure, an image is an optical representation or reproduction of a sentiment or of the appearance of something or someone.

Inner Dimension: As used in this disclosure, the term inner dimension describes the span from a first inside or interior surface of a container to a second inside or interior surface of a container. The term is used in much the same way that a plumber would refer to the inner diameter of a pipe.

Opaque: As used in this disclosure, opaque refers to an object or material that prevents the passage of radiation through the object or material.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Radial hole: As used in this disclosure, a radial hole comprises a hole that is formed through a solid cylinder such that: 1) the formed hole is cylindrical; 2) the center axis of the formed hole is perpendicular to the center axis of the solid cylinder; and, 3) the center axis of the formed hole intersects the center axis of the solid cylinder. When the term radial hole is applied to a pipe, or other hollow cylindrical object, the term applies to two holes that are formed in the surface of the pipe in a manner that is consistent with the solid cylinder definition. When the term radial hole is applied to a prism formed from an N-gon when N is an even number, the assumption should be made that the center axis is formed by a line that connects the center of the first corresponding face of the prism to the center of the second corresponding face of the prism.

Rectangular Block: As used in this disclosure, a rectangular block refers to a three dimensional structure comprising six rectangular surfaces formed at right angles. Within this disclosure, a rectangular block may further comprises rounded edges and corners.

Rounded: A used in this disclosure, the term rounded refers to the replacement of an apex or vertex of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A digital accessory comprising:
a barrier structure, a shutter door, and an adhesive;
wherein the shutter door is formed within the barrier structure;
wherein the digital accessory is configured for use with an image sensor;
wherein the image sensor is further associated with a computer;
wherein the image sensor is mounted on a flat surface;
wherein the adhesive attaches the barrier structure to the flat surface the image sensor is mounted on;
wherein the digital accessory is a protective structure;
wherein the digital accessory is a self-mounting structures;
wherein the digital accessory is placed directly over the image sensor;
wherein the shutter door opens and close the aperture to allow light to pass to the image sensor;
wherein the barrier structure comprises a rectangular block, a lens aperture, and a slider slot;

wherein the lens aperture and the slider slot are formed in the rectangular block;

wherein the rectangular block is further defined with a first face, a second face, a third face, a fourth face, a fifth face, and a sixth face;

wherein the rectangular block is further defined with a width, a height, and a depth;

wherein the rectangular block is a hollow structure formed in the shape of a rectangular prism.

2. The digital accessory according to claim 1, wherein the hollow interior of the rectangular block is sized such that the shutter door can be placed within the hollow interior of the rectangular block.

3. The digital accessory according to claim 2
wherein the lens aperture is a radial hole;
wherein the lens aperture is formed through the rectangular block from the first face to the second face;
wherein the lens aperture is sized such that the image sensor can be placed within the hollow interior of the rectangular block through the lens aperture.

4. The digital accessory according to claim 3 wherein the depth of the rectangular block is sized such that the image sensor is completely contained within the rectangular block.

5. The digital accessory according to claim 4
wherein the slider slot is a slot that is formed through the third face of the rectangular block;
wherein the range of motion of the shutter door is controlled by the span in the width direction of the slider slot.

6. The digital accessory according to claim 5
wherein the shutter door is an opaque barrier;
wherein the shutter door opens and closes the lens aperture.

7. The digital accessory according to claim 6
wherein the shutter door comprises a plate, a handle, and a grip;
wherein the handle attaches the grip to the plate;
wherein the plate is further defined with a first edge.

8. The digital accessory according to claim 7 wherein the plate is an opaque rectangular plate structure.

9. The digital accessory according to claim 8 wherein the plate is placed within the hollow interior of the rectangular block such that the plate can slide along the rectangular block along the width direction.

10. The digital accessory according to claim 9 wherein the outer dimensions of the plate are greater than the inner dimensions of the lens aperture such that the plate may be placed over the lens aperture to prevent light from reaching the image sensor.

11. The digital accessory according to claim 10
wherein the handle attaches to the first edge of the plate such that handle projects away from the interior of the plate;
wherein the handle attaches to the first edge of the plate in the manner of a cantilever;
wherein the handle attaches to the plate such that the handle extends the plane of the plate towards the third face of the rectangular block.

12. The digital accessory according to claim 11 wherein the handle is sized such that the handle projects through the slider slot.

13. The digital accessory according to claim 12 the handle forms lever that adjusts the position of the plate within the rectangular block.

14. The digital accessory according to claim 13 wherein the grip attaches to the free end of the handle.

15. The digital accessory according to claim 14 wherein the adhesive is a chemical substance that attaches the barrier structure to the flat surface.

16. The digital accessory according to claim 15
wherein the adhesive comprises a first adhesive patch and a second adhesive patch;
wherein the first adhesive patch is an adhesive coating that is applied to the second face of the rectangular block;
wherein the second adhesive patch is an adhesive coating that is applied to the second face of the rectangular block.

* * * * *